Figure 1:
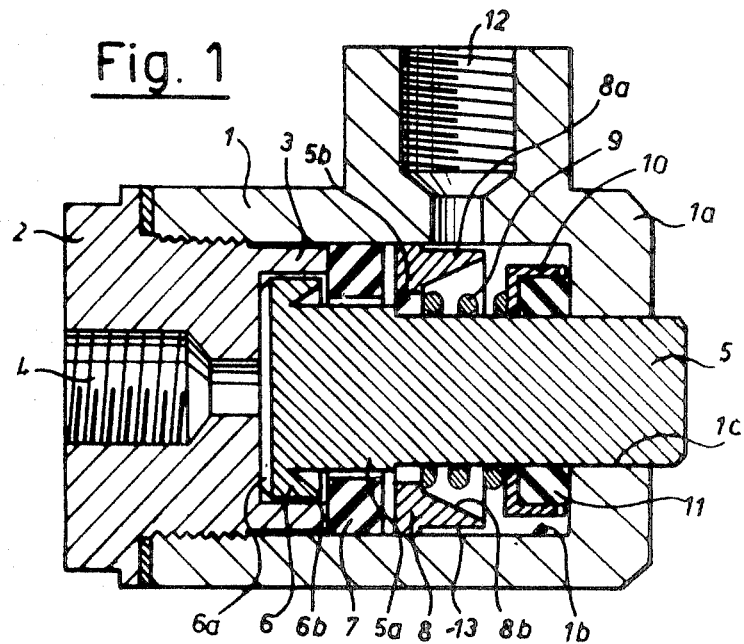

United States Patent

[11] 3,597,009

[72] Inventor Philip Sidney Baldwin
Florence, Italy
[21] Appl. No. 840,348
[22] Filed July 9, 1969
[45] Patented Aug. 3, 1971
[73] Assignees Fiat Societa per Azioni
Turin, Italy;
A.G. Racepit
Lucerne, Switzerland, part interest to each
[32] Priority July 11, 1968
[33] Italy
[31] 52398A-68

[54] PRESSURE REDUCER DEVICES
5 Claims, 2 Drawing Figs.
[52] U.S. Cl............................................ 303/6 C,
137/493.3, 137/493.9
[51] Int. Cl............................................ F16k 17/26
[50] Field of Search.................................... 303/6 C;
137/493.3, 443.6

[56] References Cited
UNITED STATES PATENTS
3,088,285  5/1963  Giacosa....................... 303/6 C FOREIGN PATENTS
1,011,651  12/1965  Great Britain................ 303/6 C Primary Examiner—Harold W. Weakley
Attorney—Sughrue, Rothwell, Mion, Zinn & Macpeak ABSTRACT: A pressure reducer device, for use in vehicle hydraulic brake systems, has a piston mounted for sliding movement in a cylinder, the pistonhead subdividing the cylinder into high-pressure and low-pressure chambers, communication between which is controlled by a resilient annular packing cooperating with the piston head. This invention concerns the improvement whereby an annular collar is mounted for sliding movement in the cylinder in proximity to the annular pistonhead packing to serve as a stop engaged by one end of a spring located in the high-pressure chamber. The spring bears at its other end against an annular seal for the passage of the piston rod through an end wall of the cylinder, and the annular collar has on its external surface remote from the pistonhead packing a recessed cylindrical portion of the smaller diameter than the internal diameter of the cylinder and which is disposed opposite an inlet port in the cylinder wall for connection to a master cylinder.

PATENTED AUG 3 1971 3,597,009

PRESSURE REDUCER DEVICES

This invention relates to pressure reducer devices, particularly for use in hydraulic brake systems in motor vehicles.

The invention relates more particularly to pressure reducer devices of the type in which a piston is mounted for sliding movement in a cylinder and has a head which cooperates in the cylinder with an annular packing of resilient material through which the piston rod passes with radial clearance.

A known form of pressure reducer device of this type is described in U.S. Pat. No. 3,443,382 and has the following characteristic features:

a. a piston mounted for sliding movement in a cylinder and having a rod the diameter of which is substantially less than the internal diameter of the cylinder and which projects through an opening in one of the end walls of the cylinder. The head of the piston divides the interior of the cylinder into a so-called "high pressure" annular chamber contained between the outer periphery of the piston rod and the internal wall of the cylinder and connectable to the outlet of a master cylinder, and into a second so-called "low pressure" chamber towards which the circular face of the piston head is directed and which is connectable to a brake circuit of the back wheels of the vehicle;

b. a reaction spring resisting movement of the piston in the direction of the high pressure chamber and maintaining the piston normally in a position corresponding to the end of its stroke in the direction of the low-pressure chamber;

c. an annular piston head packing made of elastic material disposed near and cooperating with the piston head so as to control communication between the high and low-pressure chambers;

d. a fixed stop within the cylinder preferably consisting of a cylindrical axial projection on a plug closing the interior cavity of the cylinder at the low-pressure end thereof and adapted to hold the annular piston head packing in a position such as will ensure open communication between the low and high pressure chambers when the piston is at the end of its stroke in the direction of the low-pressure chamber;

e. an annular seal which seals the passage of the piston rod through the end wall of the cylinder opposite the low-pressure chamber and which is held against said end wall by a spring which serves totally or in part the function of the reaction spring and which bears at its other extremity directly or indirectly against the piston or against the cylinder.

Such pressure reducer devices are subject to the disadvantage that air may collect in the interior of the cylinder in the course of operation, such air being difficult to remove without dismantling the device.

An object of the present invention is to provide a pressure reducer device of the aforementioned type in which the accumulation of air in the cylinder is substantially avoided in use of the device.

The pressure reducer device according to the invention is accordingly characterized in that an annular collar is mounted for sliding movement in the cylinder in proximity to the annular packing cooperating with the pistonhead, said annular collar serving as a stop engaged by one end of a spring surrounding the piston rod and bearing at its other end against an annular seal which seals the passage of the piston rod through an end wall of the cylinder, said annular collar having on its external surface remote from the pistonhead packing a cylindrical portion the external diameter of which is less than the internal diameter of the cylinder and which extends past an inlet port in the cylinder wall for connection to a master cylinder.

According to a preferred embodiment the bore of the annular collar is formed, at least in part, with a frustoconical surface the diameter of which decreases towards the piston rod seal.

Figure 2:
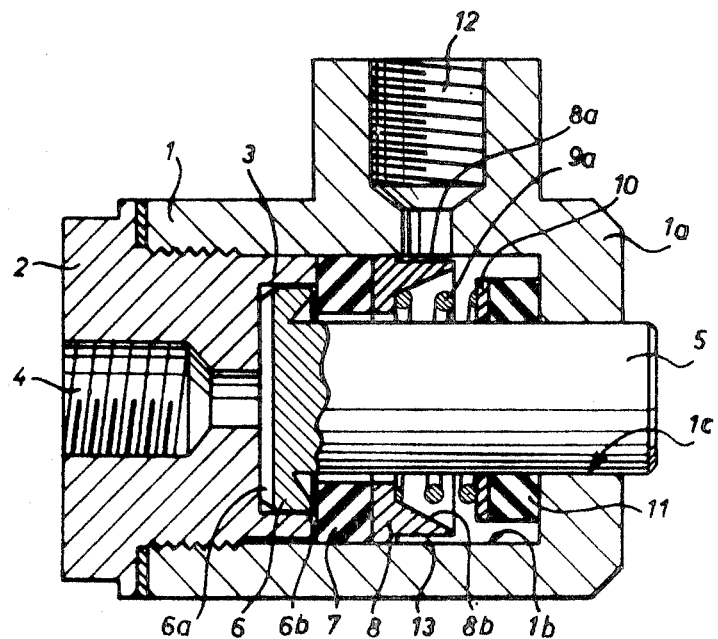

The invention will be more clearly understood from the following description, given by way of nonlimiting example, with reference to the accompanying drawings, in which:

FIG. 1 is an axial section of a pressure reducer device according to one embodiment of the invention, and FIG. 2 is an axial section of a modification of the pressure reducer device of FIG. 1.

In both figures corresponding components are designated by the same reference numerals.

The pressure reducer device illustrated in FIG. 1 has a cylinder closed at one end by a plug 2. The plug 2 is provided on its end disposed within the interior of the cylinder 1 with an axially extending annular projection 3. An axial through bore 4 is formed in the plug 2 and is connectable to the brake cylinders (not illustrated) of the rear wheels of a vehicle.

A piston disposed in the cylinder 1 has a piston rod 5 which is mounted for sliding movement in an opening 1c formed in one end wall 1a of the cylinder, opposite the plug 2. The piston rod 5 carries a head 6 at its end within the cylinder 1 in proximity to the plug 2. The head 6 on its surface facing the plug 2 is formed with a diametrical channel 6a and on its opposite surface is formed with an annular peripheral lip 6b facing the cylinder end wall 1a.

The piston head 6 is received, with radial clearance, within the annular projection 3 of the plug 2, the axial length of the projection 3 being greater than that of the head 6.

An annular pistonhead packing 7 formed of elastic material, for example rubber, bears against the end of the projection 3. The packing 7 is mounted, with a slight radial compression, in the bore of the cylinder 1 and surrounds with radial clearance a part 5a of the piston rod 5 adjoining the head 6.

The pistonhead 6 is urged towards the plug 2 by an annular collar 8 abutting an annular radial shoulder 5b formed on the piston rod 5 on the side of the packing 7 remote from the pistonhead 6. A helical spring surrounds the piston rod 5 and bears at one end against the collar 8. The other end of the spring 9 bears through the interposition of an annular cup or washer 10 against a resilient annular seal 11 which seals the passage of the piston rod 5 through the opening 1c in the end wall 1a of the cylinder 1.

The collar 8 is mounted for sliding movement in the cylinder 1, but the outer surface of the collar 8 remote from the packing 7 has an external recessed cylindrical portion 8a, the diameter of which is less than that of the internal cylindrical surface 1b of the cylinder 1, and which defines with said surface 1b an annular passage 13. The central bore of the collar 8 has a frustoconical surface 8b the diameter of which decreases in the direction of the plug 2.

The cylinder 1 is provided with an inlet port 12 through which hydraulic fluid is admitted into the cylinder in use of the pressure reducer device, for example from a master cylinder (not shown). The port 12 is disposed in such a way that it communicates with the interior of the cylinder 1 at the annular passage 13 formed between the respective cylindrical surfaces 8a and 1b.

Due to the positioning of the inlet port 10 in correspondence with the annular passage 13, hydraulic fluid entering the cylinder 1 from the port 12 in operation of the reducer device creates a strong vortex flow in the passage 13. This vortex flow causes any residual air which has collected in the cylinder 1 to form a liquid emulsion which is expelled through the bore 4, irrespective of the position occupied by the reducer device. This is assisted by the frustoconical shape of the internal surface 8b of the collar 8.

In the modification shown in FIG. 2 the collar 8 abuts directly against the pistonhead packing 7. In this case the spring 9a in the cylinder 1 does not serve as a reaction spring acting on the piston, this function being served by a separate reaction spring (not shown) acting on the piston rod 5 externally of the cylinder 1. The spring 9a serves only to space the component parts normally as shown. The other components of the pressure reducer device of FIG. 2 will not be described in detail because these are similar to those of FIG. 1, and their functions will be apparent from the preceding description.

It will be appreciated that constructional details of the pressure reducer device may be varied widely from the embodi-

What I claim is:

1. In a pressure reducer device for use in vehicle hydraulic brake systems, of the type comprising a cylinder having an end wall and a cylindrical wall with an inlet port, a piston mounted for sliding movement in the cylinder and having a head, an annular packing of resilient material in the cylinder cooperating with the pistonhead and having a central bore through which the piston rod passes with radial clearance, the improvement which consists in an annular collar mounted slidingly in the cylinder in proximity to the annular pistonhead packing, a spring surrounding the piston rod and engaging at one end said annular collar, the latter serving as a stop, and an annular seal engaged by the other end of said spring and sealing the passage of the piston rod through said end wall of the cylinder, said annular collar having on its external surface remote from the pistonhead packing, a continuous and uninterrupted cylindrical portion the external diameter of which is less than the internal diameter of the cylinder and which extends past the inlet port in the cylindrical wall.

2. Device as claimed in claim 1, wherein the bore of the annular collar is formed, at least in part, with a frustoconical surface the diameter of which increases towards the piston rod seal.

3. Device as claimed in claim 1, including an annular shoulder on the piston rod against which the annular collar bears, said spring-transmitting load to the piston rod.

4. Device as claimed in claim 1, wherein the annular collar bears directly against the resilient annular pistonhead packing.

5. Pressure reducer device, particularly for hydraulic brake systems in motor vehicles, comprising in combination:
   a. a cylinder having an end wall formed with an opening and an internal cylindrical surface;
   b. a piston slidably mounted in the cylinder and having a rod the diameter of which is substantially less than the internal diameter of the cylinder and which projects through the opening in the said cylinder end wall;
   c. a pistonhead carried by the piston rod in the interior of the cylinder and subdividing the latter into a high pressure annular chamber contained between the outer surface of the piston rod and the internal cylindrical surface of the cylinder, and into a low-pressure annular chamber towards which the circular face of the pistonhead is directed;
   d. reaction spring means resisting movement of the piston in the direction of the high-pressure chamber and maintaining the piston normally in a position corresponding to the end of its stroke in the direction of the low-pressure chamber;
   e. an annular pistonhead packing of elastic material cooperating with the pistonhead and controlling communication between the low and high-pressure chambers;
   f. fixed stop means within the low-pressure chamber of the cylinder limiting movement of the pistonhead packing towards the low-pressure chamber to ensure open communication between the low and high-pressure chambers when the piston is at the end of its stroke in the direction of the low-pressure chamber;
   g. an annular seal sealing the passage of the piston rod through the said end wall of the cylinder;
   h. an annular collar mounted slidingly in the cylinder in proximity to the pistonhead packing;
   i. a spring in the high-pressure chamber and engaging at one end said annular collar and at the other end the annular seal;
   j. a continuous and uninterrupted recessed cylindrical portion on the external surface of the collar remote from the pistonhead packing, the external diameter of said cylindrical portion being less than the diameter of the internal cylindrical surface of the cylinder, and
   k. an inlet port in the cylindrical surface of the cylinder radially outwardly of said recessed cylindrical portion, whereby hydraulic fluid entering the cylinder through the inlet port forms a vortex flow.